J. H. WILSON, G. W. DIXON AND W. E. McLAUGHLIN.
METAL WORKING MACHINE.
APPLICATION FILED OCT. 10, 1918.
1,313,365.
Patented Aug. 19, 1919.
8 SHEETS—SHEET 2.
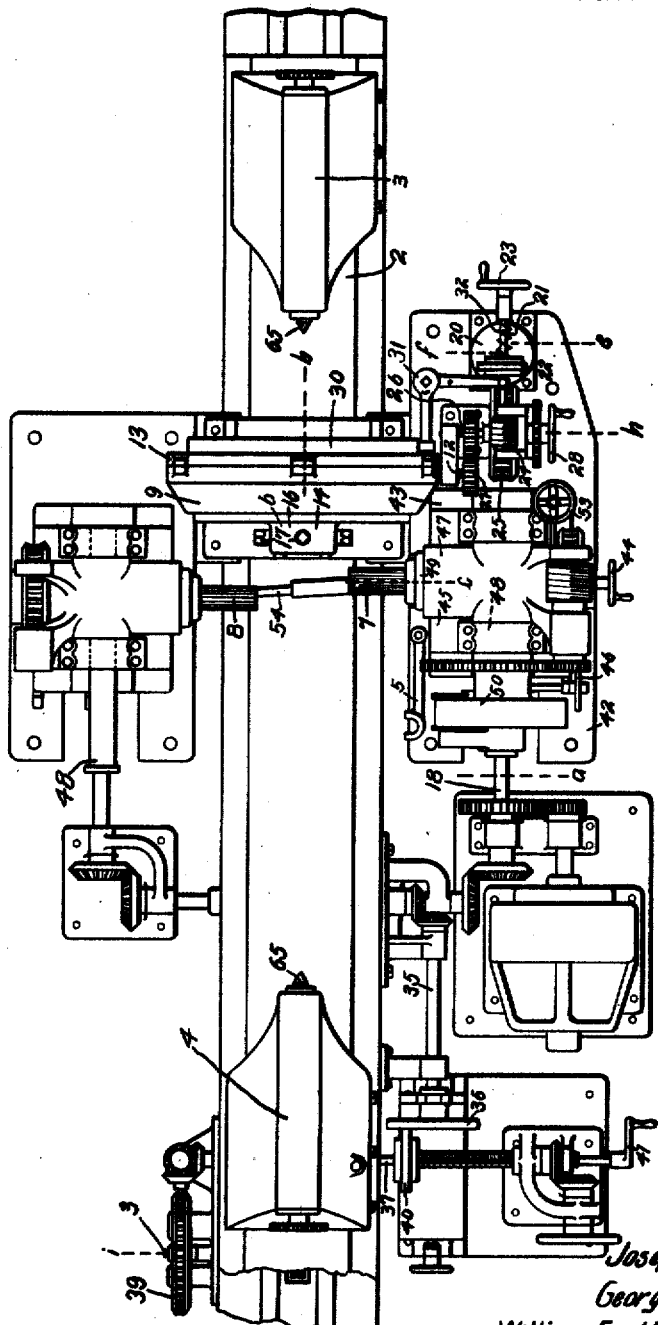
FIG. 2.
Witness:
Charles Vollbrecht
Inventors
by James W. See
Attorney

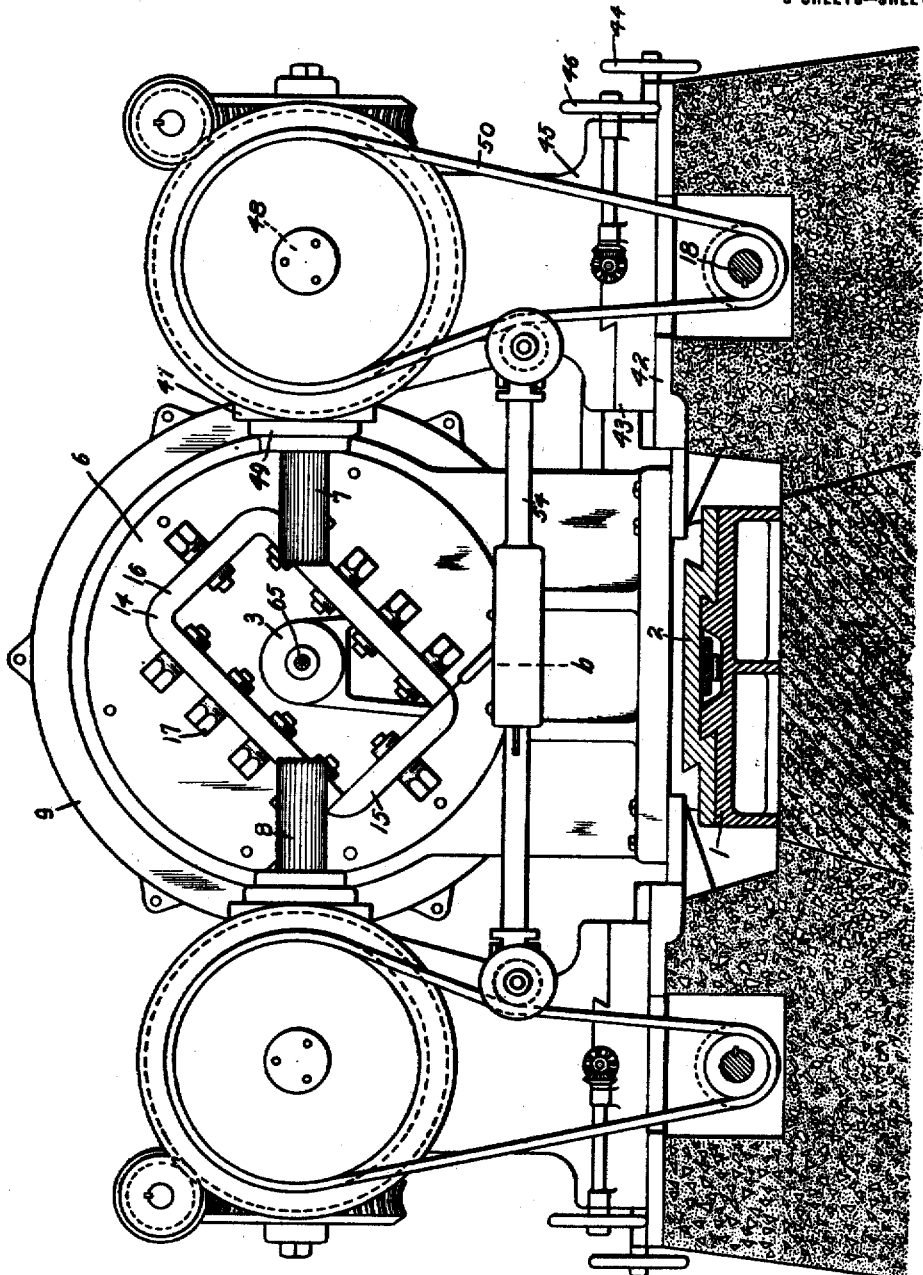

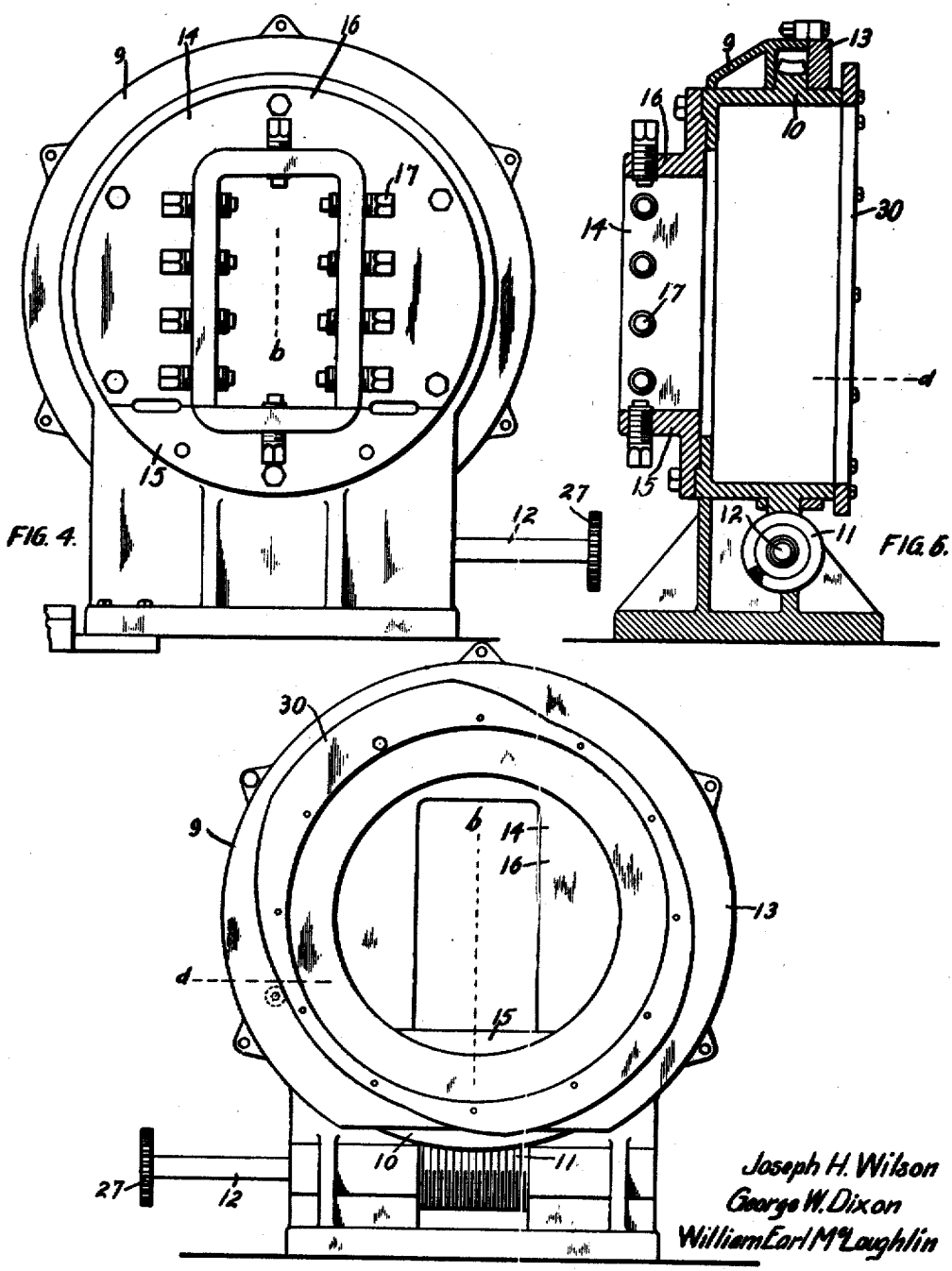

J. H. WILSON, G. W. DIXON AND W. E. McLAUGHLIN.
METAL WORKING MACHINE.
APPLICATION FILED OCT. 10, 1918.

1,313,365.

Patented Aug. 19, 1919.
8 SHEETS—SHEET 5.

Witnesses:
Charles Vollbrecht

Joseph H. Wilson
George W. Dixon
William Earl McLaughlin
Inventors by James W. See
Attorney

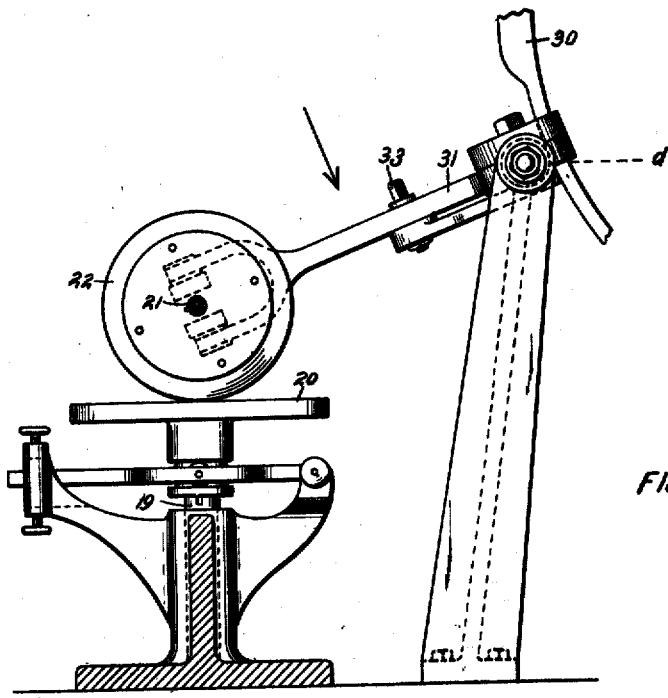
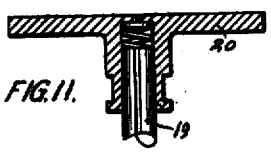
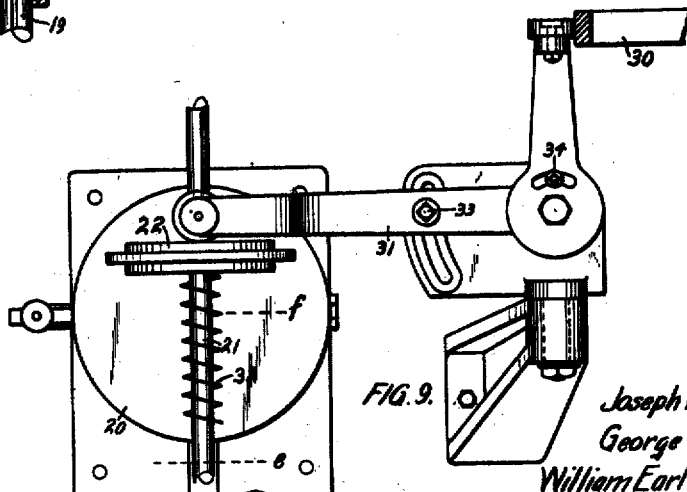

J. H. WILSON, G. W. DIXON AND W. E. McLAUGHLIN.
METAL WORKING MACHINE.
APPLICATION FILED OCT. 10, 1918.

1,313,365.

Patented Aug. 19, 1919.
8 SHEETS—SHEET 7.

Witness:
Charles Vollbrecht

Joseph H. Wilson
George W. Dixon
William Earl McLaughlin
Inventors by James W. See
Attorney J. H. WILSON, G. W. DIXON AND W. E. McLAUGHLIN.
METAL WORKING MACHINE.
APPLICATION FILED OCT. 10, 1918.

1,313,365.

Patented Aug. 19, 1919.
8 SHEETS—SHEET 8.

Witness:
Charles Vollbrecht

Joseph H. Wilson
George W. Dixon
William Earl McLoughlin
Inventors by James W. See
Attorney

UNITED STATES PATENT OFFICE.

JOSEPH H. WILSON, GEORGE W. DIXON, AND WILLIAM EARL McLAUGHLIN, OF MIDDLETOWN, OHIO, ASSIGNORS TO THE AMERICAN ROLLING MILL COMPANY, OF MIDDLETOWN, OHIO.

METAL-WORKING MACHINE.

1,313,365.  Specification of Letters Patent.  Patented Aug. 19, 1919.

Application filed October 10, 1918. Serial No. 257,562.

*To all whom it may concern:*

Be it known that we, JOSEPH H. WILSON, GEORGE W. DIXON, and WILLIAM EARL McLAUGHLIN, citizens of the United States, and residents of Middletown, Butler county, Ohio, have invented certain new and useful Improvements in Metal-Working Machines, of which the following is a specification.

This invention pertains to a machine for performing cutting work on long pieces of metal, and, while machines embodying our invention are adapted for a variety of work, we have thought best to illustrate our invention as embodied in a machine for machining multiple-throw cranks, such, for instance, as are employed in steamships having crank-shafts weighing a number of tons.

Our invention will be readily understood from the following description taken in connection with the accompanying drawings in which:—

Figure 1:
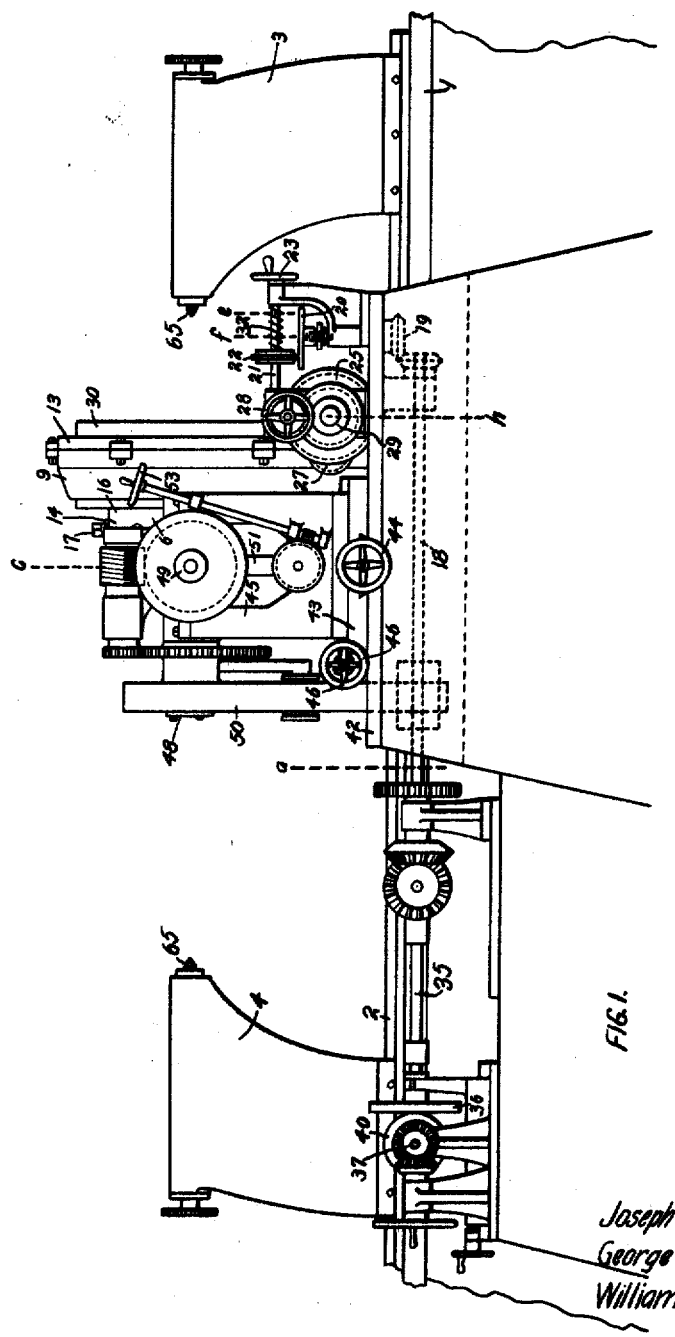
Figure 7:
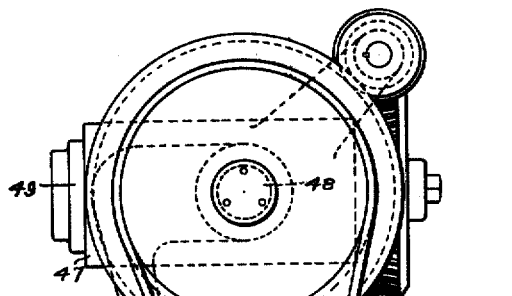
Figure 8:
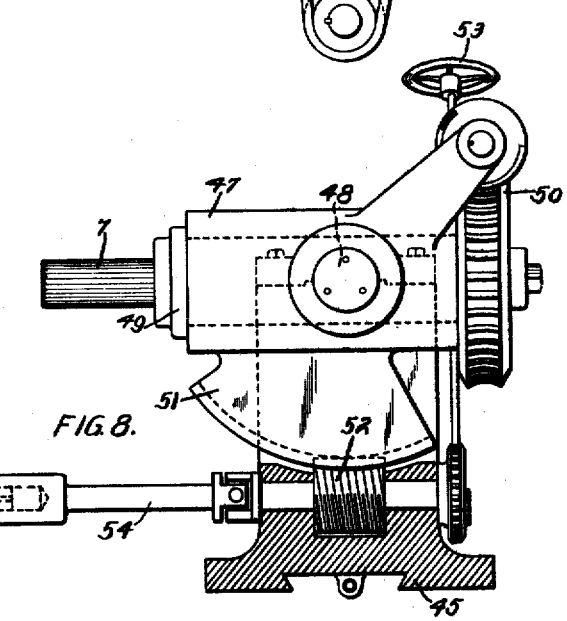
Figure 22:
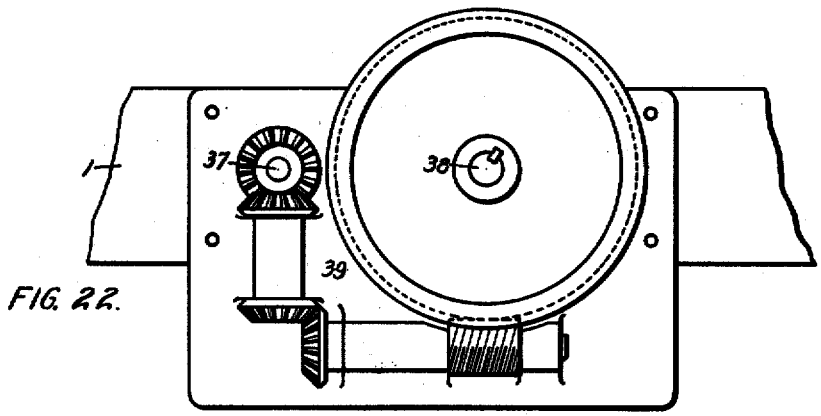
Figures 23, 24, 25:
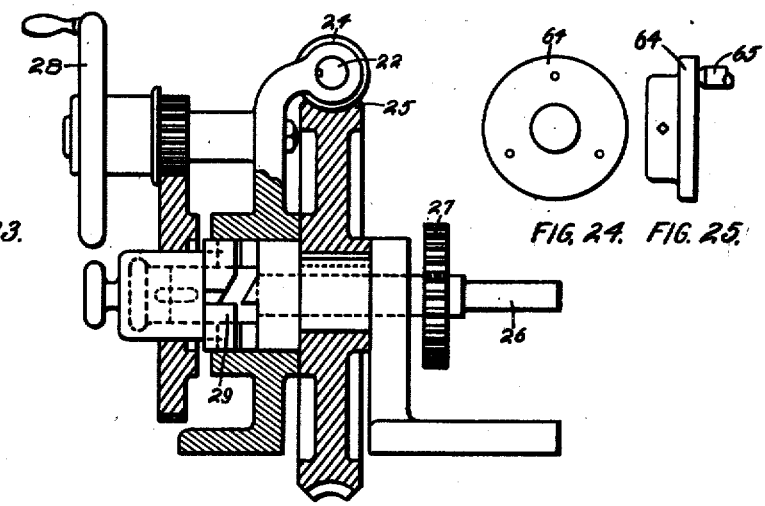

Figure 1 is a front elevation of the exemplifying machine:

Fig. 2 a plan of the same:

Fig. 3 a vertical transverse section of the same, in the plane of line *a* of Figs. 1 and 2:

Fig. 4 an elevation of the chuck side of the chuck mechanism:

Fig. 5 an elevation of the cam side of the same:

Fig. 6 a vertical section of the same in the plane of line *b* of Figs. 2, 3, 4 and 5:

Fig. 7 a side elevation of the front miller:

Fig. 8 a vertical section of the same in the plane of line *c* of Figs. 1 and 2:

Fig. 9 a plan of the mechanism for giving angular feeding motion to the chuck, the cam appearing in horizontal section in the plane of line *d* of Figs. 5, 6 and 10:

Fig. 10 a side elevation of the same, parts appearing in vertical section in the plane of line *e* of Figs. 1, 2 and 9:

Fig. 11 a vertical section of a part of the same in the plane of line *f* of Figs. 1, 2 and 9:

Figs. 12 to 16, inclusive, diagrams indicating certain steps in the progress of work being done by the machine:

Figs. 17 to 21, inclusive, diagrams illustrating certain actions on the part of the cutting-tools, the work being operated upon appearing in vertical transverse section in the plane of line *g* of Figs. 12, 14, 15, 18 and 20:

Fig. 22, a rear elevation of a portion of the table-adjusting mechanism:

Fig. 23, a vertical section of a portion of the mechanism for giving angular feeding motion to the chuck, the section appearing in the plane of line *h* of Figs. 1 and 2:

Fig. 24 a face view of an exemplifying swing center:

Fig. 25, a front elevation of the same: and

Figure 26:
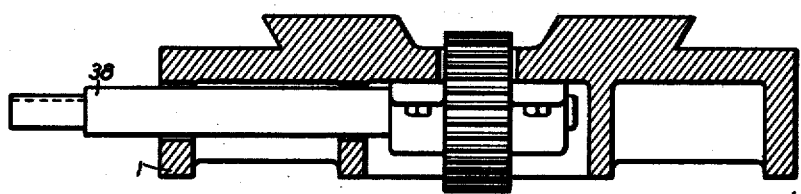

Fig. 26, a vertical section of the bed, in the plane of line *i* of Fig. 2.

A diversity of scales is employed in the drawings and, in some cases, planes are illustrated in some abnormal relationship to each other for the purpose of simplifying and clarifying the delineation.

In describing the exemplifying form of this invention, the plan will be followed of first describing details of construction, followed by description of assemblages and typical mode of operation, it being understood, however, that in the use of the machines the described order of procedure is subject to modification in the order of events with regard to a given example of product.

*General organization.*

In the drawings, giving particular attention to Figs. 1, 2 and 3:—

1, indicates the bed of the machine, forming a long fixed guideway:

2, a table fitted to slide thereon, the connection between the table and bed being of dovetailed character:

3, a puppet secured to the table and extending up therefrom and adapted to serve as a support for one end of a long piece of work, a crankshaft for instance, the puppet in the illustration having the general form of the tailstock of a lathe, with its endwise adjustable spindle and dead center carried by it:

4, a second similar puppet carried by the table, this second puppet being adapted to be moved endwise upon the table and secured rigidly thereto at a selected point:

5, a shackle anchored at one end and adapted for temporary connection with the second puppet when within its range:

6, a hollow rotator in fixed position, bridging over the table between the two puppets and provided with a chuck adapted to engage any selected point in the length of a piece of work supported by the two puppets, and to rotate the work upon the two dead centers:

7, a cutting tool, specifically an end mill carried by a fixed housing disposed at one side of the bed between the rotator and one of the puppets, this tool being capable of adjustment to and from the axis of the machine, and capable also of adjustment to and from the rotator: and 8, a second similar tool similarly mounted at the opposite side of the machine.

The puppets are to support the work while the rotator gives it angular motion and one or both tools operate upon it. The puppets are to be adjusted the proper distance apart to suit the length of the work in hand, and in this adjustment one or both of the puppets may be moved upon the table, though it is preferable that the puppet at the right be permanently fixed to the table and all of the adjustments be effected by the puppet at the left. Provision is made, as will be later explained, for sliding the table by power or hand. Looking at the parts as shown in Fig. 2, and assuming that the lefthand puppet is to be given a certain position upon the table, the table may be shifted to the right, the lefthand puppet riding with it; the table may be stopped and the puppet loosened upon the table; the shackle may be engaged with the puppet; the table may then be shifted endwise while the puppet is stationary; and the puppet may then be made fast to the table, and unshackled. The work may then be secured between the two dead centers, in the same manner as work would be placed in an ordinary lathe, and after it has thus been secured it may, by proper endwise adjustment of the table, be passed back or forth through the rotator so that the chuck thereof may grip the work at any desired point in its length. It will, of course, be understood that during these adjustments the chuck will not be rotating, and it is to be observed that the puppets are of such form that they may poke their noses through the rotator in such manner that the entire length of the work may be exposed to the left of the chuck.

*The rotator and its chuck.*

In the drawings, referring especially to Figs. 4, 5 and 6:—

9, indicates a housing disposed as a bridge over the table and forming a large circular bearing with its axis coinciding with the axis of the machine:

10, a hollow worm-wheel journaled in this housing:

11, a worm engaging the worm-wheel:

12, the shaft of the worm, adapted to be turned by power and by hand:

13, a ring secured to the right face of the housing, and forming a portion of the general bearing of the worm wheel:

14, a divided chuck secured to the worm-wheel at the lefthand face of the housing, which housing will be hereinafter referred to as the chuck housing:

15, the lower division of the chuck:

16, the upper division of the chuck, these divisions being secured to the worm-wheel in such manner that the upper division may be readily removed: and 17, set-screws carried by the chuck and presenting their points inwardly and adapted to grip a piece of work extending through the rotator and its chuck.

The chuck is to be of a character suited to the work in hand and chucks of selected size and character are assumed as being available for attachment to the worm-wheel. The chuck illustrated is in the form of a box with the set-screws through its walls, adapted for dealing with a flat slab from which a crank is to be formed. The chuck is divided in order to facilitate the placing of the work. By setting the rotator with the upper division of the chuck upward, that division may be removed from the worm gear, to be replaced after the work has been placed in proper relationship to the two puppets. Again, in the production of multiple-throw crank-shafts the removability of the upper portion of the chuck will greatly facilitate the adjustment of the work endwise in the chuck.

*Angular feeding motion of the chuck.*

In the drawings, referring particularly to Figs. 1, 2, 3, 4, 5, 6, 9, 10, 11 and 23:—

18, indicates a power-shaft, illustrated as being driven by a motor:

19, a vertical shaft bevel-geared to it:

20, a friction-plate carried by the upper end of this shaft:

21, a friction-shaft disposed across the friction-plate:

22, a friction-disk engaging the friction-plate, and splined to the friction-shaft:

23, a hand-wheel for turning the friction-shaft:

24, a worm on the friction-shaft:

25, a worm-gear:

26, the shaft of the worm-gear, loose in the worm-gear:

27, gearing connecting this shaft with shaft 12 which is worm-geared to the chuck:

28, a hand-wheel for turning shaft 26 by hand, normally loose with reference to the shaft: and 29, a clutch which can be thrown by hand to put shaft 26 into locked relationship either with the worm-gear 25 or with the hand-wheel 28.

As the power-shaft turns it causes the friction-shaft to turn at a rate according to the radial adjustment of the friction-disk on the friction-plate, the worm-gear 25 turning at corresponding rate. If the clutch 29 be thrown one way it will lock the worm-gear to its shaft and cause the chuck to be rotated. If, however, the clutch be thrown in the other direction it will leave the shaft free from the worm-wheel but will lock the shaft to the hand-rig so that by means of hand-wheel 28 the chuck may be turned at comparatively rapid rate. Proceeding with these figures of the drawings:—

30, indicates a cam removably bolted to the back of the worm-gear which carries the chuck:

31, a bell crank-lever having one end in engagement with the periphery of this cam and having its other end in engagement with the friction-disk 22:

32, a spring on the friction-shaft urging the friction-disk in the direction opposite to the one in which it is moved by the bell-crank-lever:

33, a bolt connecting the bell crank-lever with a fixed segmental slot and adapted to lock the bellcrank lever against being operated by the cam: and 34, a bolt for locking the two arms of the bellcrank-lever in adjusted relationship to each other.

When the friction-plate is released from the friction-disk then the chuck may be turned by hand by means of the hand-wheel 23. However, when the friction-disk and friction-plate are in engagement with each other, and the clutch is thrown to connect the worm-gear with its shaft, then the chuck will be turned by power slowly at certain rate. In the operation of an end mill, by which is meant a mill having longitudinal teeth as well as end teeth, and the work is fed angularly with reference to the mill, it is desirable, in many cases, to vary the rate of angular feed with some reference to the length of the radial cut being produced upon the work by the mill. Thus, for instance, the cheek of a crankshaft may present very little cut radial to the shaft in one angular position of the cheek, and thus call for a certain degree of angular feed, while in another angular position of the cheek the cut may be of much greater radial extent and call for a slower rate of angular feed. In the present instance, the cam is assumed as having been contoured in recognition of the desired variation in the rate of angular feed, and this variation it automatically effects by shifting the friction-disk radially on the plate, so that at one stage of rotation of the chuck the feed will be rapid and at another stage comparatively slow.

By locking the bellcrank to the segmental slot, the feed will be free from domination by the cam. By locking the two arms of the bellcrank-lever in adjusted relationship to each other, the general rate of the variable feed can be altered.

Movements of the table.

In the drawings, referring particularly to Figs. 1, 2, 22 and 26:—

35, indicates a shaft driven by the power-shaft:

36, a friction-plate thereon:

37, a shaft crossing the bed of the machine:

38, the bull-wheel shaft which drives the table:

39, gearing, of worm type, connecting these two shafts:

40, a friction-disk engaging the friction-plate and splined on shaft 37: and 41, a handle on shaft 37.

When the friction-disk and friction-plate of the table-driving mechanism are engaged, then the power-shaft may impart traveling motion to the table in effecting what might be called the grand movements of the table, as has been heretofore referred to, and the rate at which the table is shifted endwise may be governed by adjusting the friction-disk upon the friction-plate. The finer movements of the table may be effected by hand, by disconnecting the friction-plate and friction-disk and employing the handle 41. The endwise adjustment of the table, and the work carried by it, may thus be effected with nicety, and when the table has been properly adjusted endwise it becomes there locked by the gearing connecting the two cross-shafts.

The millers.

Particular description will be given only of the miller on the front side of the machine, the one on the other side being like it, though in Fig. 2 the miller on the far side of the machine is shown without many of its adjuncts. In the drawings, and referring particularly to Figs. 1, 2, 3, 7 and 8:—

42, represents a sole-plate at the front side of the machine:

43, a sub-table mounted to slide on the sole-plate to and from the machine:

44, a handwheel for adjusting the sub-table on the sole-plate:

45, a miller-housing fitted to slide on the sub-table in a direction parallel with the length of the machine:

46, a hand-wheel for adjusting the housing on the sub-table:

47, a spindle-bearing with its axis disposed in a vertical plane at right angles to the axis of the general machine:

48, trunnions connecting the spindle-bearing with the miller-housing, their common axis being horizontal and intersecting the axis of the spindle-bearing:

49, the miller-spindle journaled in the spindle-bearing and carrying the end mill 7 at its front end:

50, transmission mechanism of gear and chain type, connecting the spindle with the power-shaft 18 and arranged to transmit motion to the spindle whatever may be the angular position of the spindle-bearing:

51, a worm-gear segment fast with the spindle-bearing:

52, a worm journaled in the miller-housing and engaging its segment:

53, a hand-wheel for turning this worm: and 54, a telescopic tumbling-shaft connecting the worm-shaft with the worm-shaft of the miller on the opposite side of the machine:

It will be seen that the axis of the milling spindle is capable of being adjusted to and from the chuck, that is to say, axially of the general machine, and that the mill is capable of being adjusted to and from the general axis of the machine, and that the mill is capable of occupying a declined position or of being elevated so that its axis may intersect the axis of the general machine.

The miller on the farther side of the machine is like the one on the front side, and is similarly driven, and the tumbling-shaft permits of both spindles being adjusted upon their trunnions in unison, the telescopic tumbling character of this shaft permitting of its operation even if the two mills be adjusted into different vertical planes and be adjusted at diverse distances from the general axis of the machine. If both mills be of the same diameter and have their axes in the same vertical plane then, of course, they would conjointly produce a groove in the work corresponding with their diameter. But if the two mills are adjusted to lie in dissimilar vertical planes, then a groove would be produced whose opposite shores are a greater distance apart than is represented by the diameter of a single mill. The two mills may thus cut in the work a groove having a width equal substantially to twice the diameter of one of the mills.

*Angular feeding.*

Figure 21:
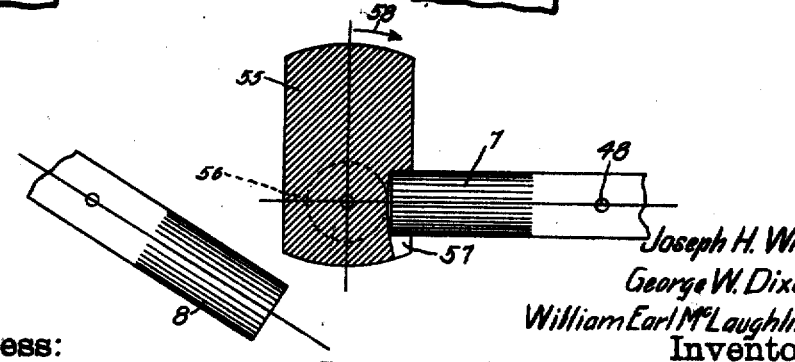

Before a mill attacks the work it is inclined downwardly clear of the work and then, while the work is not rotating, the mill is brought up into the work, the mill, of course, rotating, after which the feeding is accomplished by the rotation of the work. In Fig. 21 of the drawing:—

55, indicates a slab from which a crank is to be turned:

56, the shaft or neck which is to be turned:

57, the cut which has been produced in the slab by the rising of the cutter while the slab is stationary: and 58, an arrow indicating the direction of rotation to be later given to the slab with the center of the shaft as an axis.

Looking at Fig. 21 the slab is to be assumed as stationary and both the mills in the position indicated for the left-hand mill, both mills being at this time in rotation, but free from the work. Giving consideration to the right hand mill 7 only, its end is to be such distance from the axis of the shaft that the end of the mill, when elevated, will correspond with the radius of the shaft. The mill is then to be elevated to the work which it now attacks while the work is stationary, the elevation of the mill continuing until its axial line intersects the axial line of the shaft. The result will be that the mill has produced the cut 57. No further angular adjustment is now to be given to the mill but the slab is to be given a feeding motion in the direction of the arrow, the result being that all of the metal of the slab will have turned in it a circumferential groove extending to the shaft, the groove being completed at one complete turn of the slab. As a matter of practice, where two mills are used, both mills will occupy the downward angular position and will be elevated into the work simultaneously, after which the work is started into rotation. When the work indicated in Fig. 21 first starts into rotation then, as will be noticed, the mill has very little length of cut, but as the rotation of the work proceeds the length of cut becomes greater and the angular advance of the work should be at a slower rate. This is accomplished, automatically, by the cam arrangement, previously described, which slows down the rate of angular feed of the work in accordance with the greatest length of cut being taken by either mill.

Regardless of the slab form of the work in Fig. 21, the same method of angular feeding the mill to the work while the work is stationary would be followed if the part of the work surrounding the shaft were a complete concentric collar instead of the cheek of a crank, that is to say, even if the work to be reduced were of concentric character the inclined mill would be moved angularly to the attack until the axis of the mill intersected the axis of rotation of the work.

*Filleting.*

See Figs. 17 to 20 inclusive in which:—

59, indicates a line representing the axis of the mill and intersecting the axis of rotation of the work:

60, a line representing the axis of the mill shortly before it intersects the axis of rotation of the work:

61, the work being operated upon:

62, a circumferential groove produced therein by the mill and having sharp corners where the bottom of the groove joins its side walls; and 63, a similar groove with round corners or fillets where the bottom of the groove joins its side walls.

Figure 18:
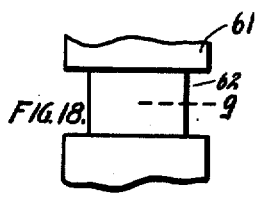
Figure 20:
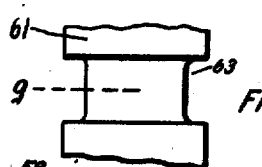

If the mill be a cylindrical one, that is to say with a flat end, and if it be adjusted with its axis intersecting the axis of the work, then the groove produced by the mill will be such as indicated in Fig. 18, there being no fillets. But if the mill be angularly adjusted only with its axis coinciding with the line 60 then, while the groove will be milled the full diameter of the mill, the same as in Fig. 18, the cylindrical part of the reduced portion will have a length equal only to the chord of the circle of the mill taken at the line of intersecting the center of the work, the balance of the reduced portion, at each of its ends where it joins the side walls of the groove, being filleted as shown in Fig. 20. By this simple means a truly cylindrical cutter may produce filleted or unfilleted corners, as desired, by simply adjusting the angle of the mill.

*An exemplifying program of work.*

See Figs. 12 to 16 inclusive.

Figure 12:
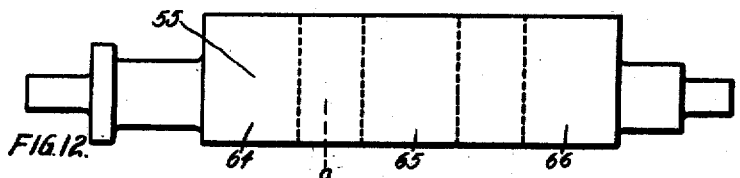
Figure 13:
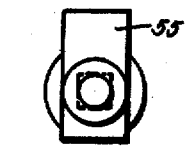
Figure 15:
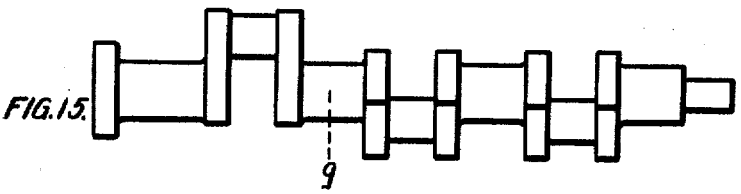
Figure 16:
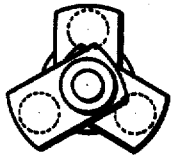
Figure 17:
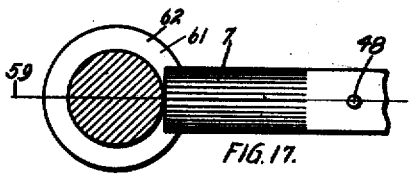
Figure 19:
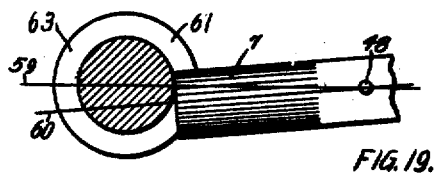

Let it be assumed that a three-throw crank-shaft is to be formed in our machine from a slab, such as is illustrated in Fig. 12, in which 64, 65 and 66 represent the zones of the slab which are to form the throws of the crank-shaft, the intermediate zones to form the intermediate journals, the complete shaft being represented by Figs. 15 and 16.

Figure 14:
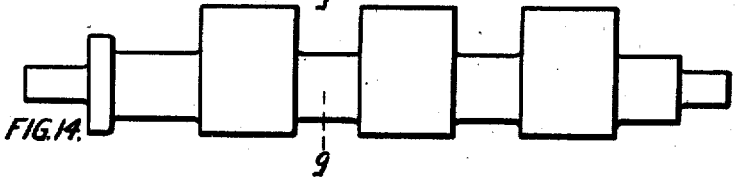

The slab would be centered and placed in our machine and adjusted in the chuck for gripping one of the zones, whereupon the mills would operate upon the rotating work and produce the two intermediate journals, as seen in Fig. 14. The work would then be removed and heated and twisted to bring the three throws into proper angular relationship, after which the work would be again placed in the machine and, if desired, all the journals and the collar completed. Swing centers 64, such as illustrated in Figs. 24 and 25, would then be applied to the work, which would now be carried on the dead centers 65 while engaging such selected centers in the swing centers as are appropriate to the wrists of the crank-shaft. Then, while appropriate parts of the work are gripped by the chuck, the throws will be milled out, in succession, and the wrists formed, and in the forming of the journals or the wrists, fillets in the corners may be provided or omitted, according to the angular adjustment of the mills.

It will of course be understood that the exemplifying machine particularly set forth constitutes but a single example of the embodiment of our invention. We have simply explained the principle of our invention and the best mode in which we have at present contemplated applying that principle.

We claim:—

1. A metal working machine comprising, a bed, a reciprocable table thereon, a pair of puppets supported by the table, a chuck-housing bridging over the table between the two puppets, a rotatable hollow chuck mounted in such chuck-housing, and a tool disposed at one side of the bed between the chuck and one of the puppets, combined substantially as set forth.

2. A metal working machine comprising, a bed, a reciprocable table thereon, a pair of puppets supported by the table, means for adjusting one of said puppets to and from the other on the table, a chuck-housing bridging over the table between the two puppets, a rotatable hollow chuck mounted in such chuck-housing, and a tool disposed at one side of the bed between the chuck and one of the puppets, combined substantially as set forth.

3. A metal working machine comprising, a bed, a reciprocable table thereon, a pair of puppets supported by the table, an endwise adjustable dead center carried by each puppet, a chuck-housing bridging over the table between the two puppets, a rotatable hollow chuck mounted in such chuck-housing, and a tool disposed at one side of the bed between the chuck and one of the puppets, combined substantially as set forth.

4. A metal working machine comprising, a bed, a reciprocable table thereon, a pair of puppets supported by the table, one of said puppets being adjustable on the table to and from the other puppet, a shackle anchored at one end and adapted for connection with the adjustable puppet, combined substantially as set forth.

5. A metal working machine comprising, a bed, a reciprocable table thereon, a pair of puppets supported by the table, a chuck-housing bridging over the table between the two puppets, a rotatable hollow chuck mounted in such chuck-housing, a power-shaft, transmitting mechanism between said power-shaft and the table for moving the table endwise by power, a speed-changing mechanism involved in said transmission and serving to regulate the rate of endwise motion of the table, and a tool disposed at one side of the bed between the chuck and one of the puppets, combined substantially as set forth.

6. A metal working machine comprising, a bed, a reciprocable table thereon, a pair of puppets supported by the table, a chuck-housing bridging over the table between the two puppets, a rotatable hollow chuck mounted in such chuck-housing, a power-shaft, transmitting mechanism between said power-shaft and the table for moving the table endwise by power, a speed-changing mechanism involved in said transmission and serving to regulate the rate of endwise motion of the table, a tool disposed at one side of the bed between the chuck and one of the puppets, a hand-operable shaft in such transmitting mechanism, and gearing of worm type between the hand-operable shaft and the table to serve in locking the table in adjusted position, combined substantially as set forth.

7. A metal working machine comprising, a bed, a reciprocable table thereon, a pair of puppets supported by the table, a chuck-housing bridging over the table between the two puppets, a hollow rotatable worm-gear journaled in the chuck-housing, a hollow chuck mounted removably on said worm gear, and a tool disposed at one side of the bed between the chuck and one of the puppets, combined substantially as set forth.

8. A metal working machine comprising, a bed, a reciprocable table thereon, a pair of puppets supported by the table, a chuck-housing bridging over the table between the two puppets, a hollow rotatable worm-gear journaled in the chuck-housing, a removable chuck formed in separate sections secured to said worm gear, and a tool disposed at one side of the bed between the chuck and one of the puppets, combined substantially as set forth.

9. A metal working machine comprising, a bed, a reciprocable table thereon, a pair of puppets supported by the table, a chuck-housing bridging over the table between the two puppets, a hollow rotatable worm-gear journaled in the chuck-housing, a hollow chuck mounted removably on said worm-gear, a ring secured to one face of the chuck-housing and forming a part of the bearing for the journal of the worm-gear, and a tool disposed at one side of the bed between the chuck and one of the puppets, combined substantially as set forth.

10. A metal working machine comprising, a bed, a reciprocable table thereon, a pair of puppets supported by the table, a chuck-housing bridging over the table between the two puppets, a hollow rotatable worm-gear journaled in the chuck-housing, a hollow chuck secured removably against said worm-gear, a box forming the walls of the hollow chuck, set screws projecting through said walls, and a tool disposed to one side of the bed between the chuck and one of the puppets, combined substantially as set forth.

11. A metal working machine comprising, a chuck housing, a rotatable chuck mounted therein, a power shaft, transmission mechanism disposed between the power shaft and the chuck, a speed changing device disposed in said transmitting mechanism and adapted to vary the proportionate rate of turning of the power shaft and the chuck, and mechanism operated by the rotation of the chuck for automatically adjusting said speed changing device, combined substantially as set forth.

12. A metal working machine comprising, a chuck housing, a rotatable chuck mounted therein, a power shaft, transmission mechanism disposed between the power shaft and the chuck, a speed changing device disposed in said transmitting mechanism and adapted to vary the proportionate rate of turning of the power shaft and the chuck, a cam turning with the chuck, and means operated by the cam for automatically altering the speed changer, combined substantially as set forth.

13. A metal working machine comprising, a chuck housing, a rotatable chuck mounted therein, a power shaft, transmission mechanism disposed between the power shaft and the chuck, a speed changing device involving a shifting speed changing disk, a cam rotating with the chuck, and a bell crank lever having one of its ends engaging said cam and its other end engaging said shifting disk, combined substantially as set forth.

14. A metal working machine comprising, a chuck housing, a rotatable chuck mounted therein, a power shaft, transmission mechanism disposed between the power shaft and the chuck, a speed changing device involving a shifting speed changing disk, a cam rotating with the chuck, a bell crank lever having one of its ends engaging said cam and its other end engaging said shifting disk, and a fixed segment and screw for locking the bell crank lever out of domination by the cam, combined substantially as set forth.

15. A metal working machine comprising, a chuck housing, a rotatable chuck mounted therein, a power shaft, transmission mechanism disposed between the power shaft and the chuck, a speed changing device involving a shifting speed changing disk, a cam rotating with the chuck, a bell crank lever having one of its ends engaging said cam and its other end engaging said shifting disk, and means for adjusting the two arms of the bell crank with reference to each other, combined substantially as set forth.

16. A metal working machine comprising, a chuck housing, a rotatable chuck mounted therein, a power shaft, transmission mechanism disposed between the power shaft and the chuck, a speed changing device involving a shifting speed changing disk, a cam rotating with the chuck, a bell crank lever having one of its ends engaging said cam and its other end engaging said shifting disk, and a spring urging the shifting disk in opposition to its motion as affected by the cam, combined substantially as set forth.

17. A metal working machine comprising, a chuck housing, a hollow chuck mounted for rotation therein, a power shaft, transmission mechanism disposed between the power shaft and the chuck, a loose gear involved in said transmission mechanism, a hand shaft for turning the chuck by hand, and a clutch adapted to connect the loose gear positively into the transmission mechanism, combined substantially as set forth.

18. A metal working machine comprising, a chuck housing, a hollow chuck mounted for rotation therein, a power shaft, transmission mechanism disposed between the power shaft and the chuck, a loose gear involved in said transmission mechanism, a hand shaft for turning the chuck by hand, and a clutch adapted to connect the loose gear positively into the transmission mechanism and to lock the hand shaft to the chuck driving mechanism while said loose gear is disconnected from the power shaft, combined substantially as set forth.

19. A metal working machine comprising, a chuck housing, a hollow worm-gear journaled therein, a hollow chuck mounted on the worm-gear, a worm and worm-gear shaft for turning the worm, a worm-wheel loose with reference to said worm-wheel shaft, a worm and hand-shaft for turning said loose worm-gear, a hand-shaft loose with reference to said loose worm-gear, and a clutch adapted to be thrown in either direction to lock either of said hand-shafts to the worm-shaft which drives the chuck, combined substantially as set forth.

20. A metal working machine comprising, a bed, a reciprocable table thereon, a pair of puppets supported by the table, a chuck-housing bridging over the table between the two puppets, a rotatable hollow chuck mounted in such chuck-housing, a tool disposed at one side of the bed, and mechanism for adjusting the tool lengthwise of the bed, combined substantially as set forth.

21. A metal working machine comprising, a bed, a reciprocable table thereon, a pair of puppets supported by the table, a chuck-housing bridging over the table between the two puppets, a rotatable hollow chuck mounted in such chuck-housing, a tool disposed at one side of the bed, and mechanism for adjusting the tool to and from the bed, combined substantially as set forth.

22. A metal working machine comprising, a bed, a reciprocable table thereon, a pair of puppets supported by the table, a chuck-housing bridging over the table between the two puppets, a rotatable hollow chuck mounted in such chuck-housing, a tool disposed at one side of the bed, mechanism for adjusting the tool length-wise of the bed, and mechanism for adjusting the tool to and from the bed, combined substantially as set forth.

23. A metal working machine comprising, a bed, a reciprocable table thereon, a pair of puppets supported by the table, a chuck-housing bridging over the table between the two puppets, a rotatable hollow chuck mounted in such chuck-housing, a tool disposed at one side of the bed, a tool disposed at the opposite side of the bed, and mechanism for adjusting one of said tools length-wise of the bed independently of the other tool, combined substantially as set forth.

24. A metal working machine comprising, a bed, a reciprocable table thereon, a pair of puppets supported by the table, a chuck-housing bridging over the table between the two puppets, a rotatable hollow chuck mounted in such chuck-housing, a tool disposed at one side of the bed, a tool disposed at the opposite side of the bed, and mechanism for adjusting the two tools length-wise of the bed independently of each other, combined substantially as set forth.

25. A metal working machine comprising, a bed, a reciprocable table thereon, a pair of puppets supported by the table, a chuck-housing bridging over the table between the two puppets, a rotatable hollow chuck mounted in such chuck-housing, a sole-plate at one side of the bed, a sub-table fitted to slide on the sole-plate, a tool-housing fitted to slide on the sub-table, a tool carried by the tool-housing, mechanism for adjusting the sub-table on the sole-plate, and mechanism for adjusting the tool-housing on the sub-table, combined substantially as set forth.

26. A metal working machine comprising, a bed, a reciprocable table thereon, a pair of puppets supported by the table, a chuck-housing bridging over the table between the two puppets, a rotatable hollow chuck mounted in such chuck-housing, a sole-plate at one side of the bed, a sub-table fitted to slide on the sole-plate transversely of the bed, mechanism for adjusting the sub-table on the sole-plate, a tool-housing fitted to slide on the sub-table length-wise of the bed, and mechanism for adjusting the tool-housing on the sub-table, and a tool carried by the tool-housing, combined substantially as set forth.

27. A metal working machine comprising, a bed, a reciprocable table thereon, a pair of puppets supported by the table, a chuck-housing bridging over the table between the two puppets, a rotatable hollow chuck mounted in such chuck-housing, a tool-housing disposed at one side of the bed, a spindle-bearing carried by the tool-housing, a spindle journaled in spindle-bearing, a tool carried by the spindle, and means for rotating the spindle, combined substantially as set forth.

28. A metal working machine comprising, a bed, a reciprocable table thereon, a pair of puppets supported by the table, a chuck-housing bridging over the table between the two puppets, a rotatable hollow chuck mounted in such chuck-housing, a tool-housing disposed at one side of the bed, a spindle-bearing carried by the tool-housing, a spindle journaled in the spindle-bearing, a tool carried by the spindle, means for rotating the spindle, horizontal trunnions connecting the spindle-bearing with the tool-housing and arranged parallel with the bed, and mechanism for adjusting the spindle-bearing on its trunnions, combined substantially as set forth.

29. A metal working machine comprising, a bed, a reciprocable table thereon, a pair of puppets supported by the table, a chuck-housing bridging over the table between the two puppets, a rotatable hollow chuck mounted in such chuck-housing, a tool-housing disposed at one side of the bed, a spindle-bearing carried by the tool-housing, a spindle journaled in the spindle-bearing, a tool carried by the spindle, means for rotating the spindle, horizontal trunnions connecting the spindle-bearing with the tool-housing and arranged parallel with the bed, a worm-gear segment carried by the spindle-bearing, and a worm for adjusting the worm-bearing on its trunnions, combined substantially as set forth.

30. A metal working machine comprising, a bed, a reciprocable table thereon, a pair of puppets supported by the table, a chuck-housing bridging over the table between the two puppets, a rotatable hollow chuck mounted in such chuck-housing, tool-housings disposed at opposite sides of the bed, a spindle-bearing mounted in each tool-housing on trunnions parallel with the bed, and mechanism for adjusting the spindle-bearings simultaneously, combined substantially as set forth.

31. A metal working machine comprising, a bed, a reciprocable table thereon, a pair of puppets supported by the table, a chuck-housing bridging over the table between the two puppets, a rotatable hollow chuck mounted in such chuck-housing, tool-housings at each side of the bed, a spindle-bearing mounted in each tool-housing on trunnions parallel with the bed, worm-gear segments carried by the spindle-bearing, a worm carried in each tool-housing for coöperating with the worm-gear segments in adjusting the spindle-bearings on their trunnions, and a telescopic tumbling shaft connecting the two worms, combined substantially as set forth.

32. A metal working machine comprising, a bed, a reciprocable table thereon, a pair of puppets supported by the table, a chuck-housing bridging over the table between the two puppets, a rotatable hollow chuck mounted in such chuck-housing, and a pair of end mills mounted for rotation and adjustment at each side of the bed, combined substantially as set forth.

33. A metal working machine comprising, a bed, a reciprocable table thereon, a pair of puppets supported by the table, a chuck-housing bridging over the table between the two puppets, a rotatable hollow chuck mounted in such chuck-housing, a tool-housing disposed at one side of the bed, a spindle-bearing mounted therein, trunnions connecting the spindle-bearing with the tool-housing and arranged parallel with the bed, a spindle journaled in the spindle-bearing, a worm-gear on the spindle, a gear on one of the trunnions, connections between said gear and the worm wheel, and means for turning the gear, combined substantially as set forth.

34. A metal working machine comprising, a bed, a reciprocable table thereon, a pair of puppets supported by the table, a chuck-housing bridging over the table between the two puppets, a rotatable hollow chuck mounted in such chuck-housing, a tool-housing disposed at one side of the bed and adjustable to and from the bed and length-wise of the bed, a spindle-bearing trunnioned in the tool-housing, a spindle journaled in the spindle-bearing, a gear on one of the trunnions, transmitting mechanism connecting said gear with the spindle, a power shaft, and connections from the power shaft to said gear, combined substantially as set forth.

35. A metal working machine comprising, a bed, a reciprocable table thereon, a pair of puppets supported by the table, a chuck-housing bridging over the table between the two puppets, a rotatable hollow chuck mounted in such chuck-housing, an end mill disposed at each side of the bed, and means for adjusting said mills independently of each other length-wise of the bed, combined substantially as set forth.

36. A metal working machine comprising, a bed, a reciprocable table thereon, a pair of puppets supported by the table, a chuck-housing bridging over the table between the two puppets, a rotatable hollow chuck mounted in such chuck-housing, an end mill mounted on horizontal trunnions at one side of the bed, and means for adjusting said mill on its trunnions while the work supported by said puppets and chuck is stationary, combined substantially as set forth.

37. A metal working machine comprising, a bed, a reciprocable table thereon, a pair of puppets supported by the table, a chuck-housing bridging over the table between the two puppets, a rotatable hollow chuck mounted in such chuck-housing, an end mill mounted on horizontal trunnions at each side of the bed, and means for adjusting said mills on their trunnions while the work supported by the puppets and chuck is stationary, combined substantially as set forth.

JOSEPH H. WILSON.
GEORGE W. DIXON.
WILLIAM EARL McLAUGHLIN.

Witnesses:
M. S. BELDEN,
JUSTUS VOLLRECHT.

Copies of this patent may be obtained for five cents each, by addressing the "Commissioner of Patents Washington, D. C."